Figure 1:
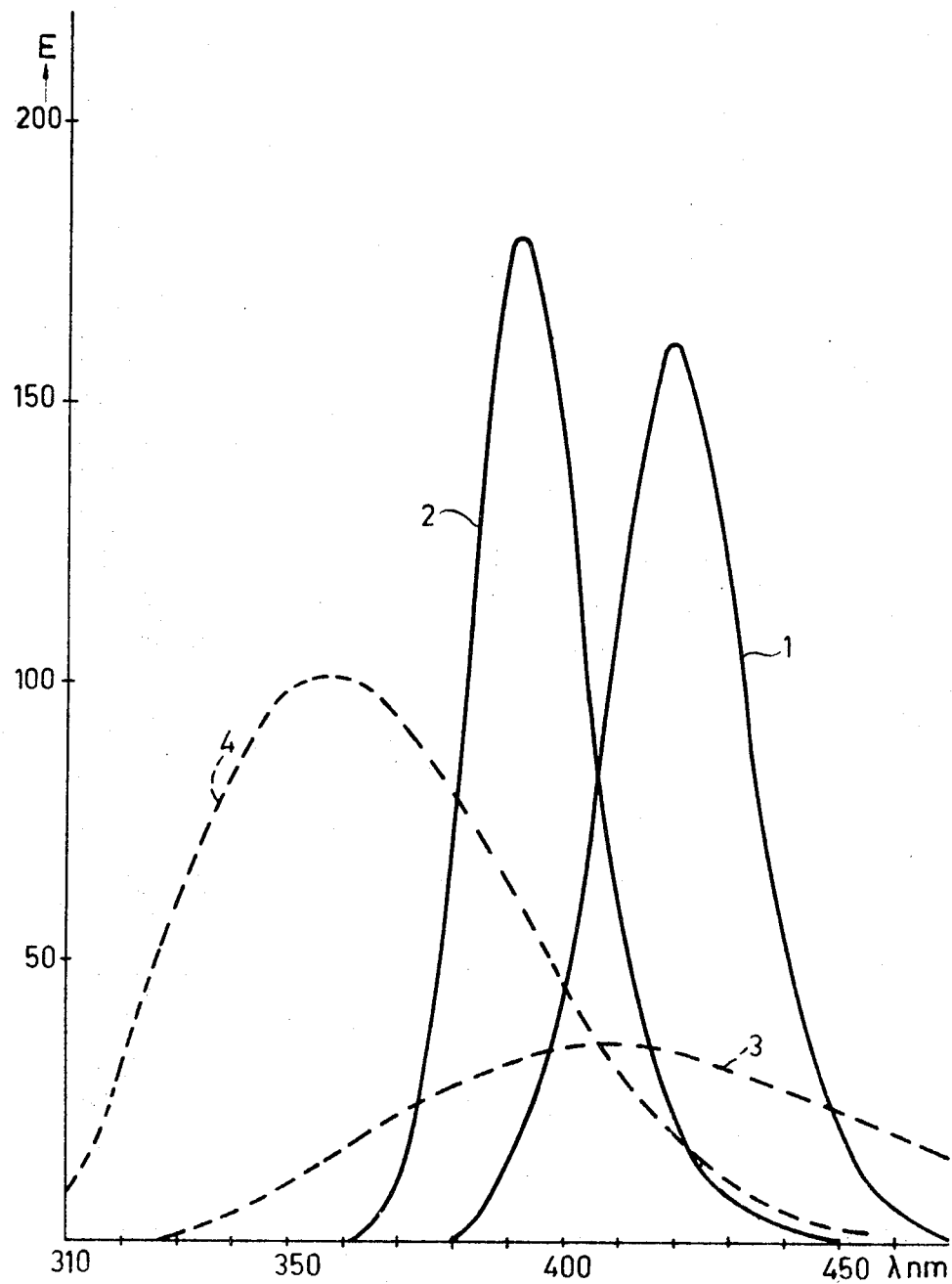

United States Patent

[11] 3,599,028

| [72] | Inventors | Willem Lambertus Wanmaker;<br>Johannes Wilhelmus Ter Vrugt; Johannus<br>Godefridus Verlijsdonk, all of Emmasingel,<br>Eindhoven, Netherlands |
|---|---|---|
| [21] | Appl. No. | 708,836 |
| [22] | Filed | Feb. 28, 1968 |
| [45] | Patented | Aug. 10, 1971 |
| [73] | Assignee | U.S. Philips Corporation<br>New York, N.Y. |
| [32] | Priority | Mar. 1, 1967 |
| [33] | | Netherlands |
| [31] | | 6,703,401 |

[54] MERCURY VAPOR DISCHARGE LAMP EMPLOYING EUROPIUM ACTIVATED CALCIUM AND/OR STRONTIUM PYROPHOSPHATE LUMINESCENT MATERIAL
3 Claims, 2 Drawing Figs.

[52] U.S. Cl. .................................................. 313/109, 252/301.4 P

[51] Int. Cl. ................................................. H01j 1/63, C09k 1/36
[50] Field of Search ....................................... 252/301.4 P; 313/109

[56] References Cited
UNITED STATES PATENTS

| 3,141,990 | 7/1964 | Ray .............................. | 313/109 |
| 3,422,024 | 1/1969 | McAllister .................... | 252/301.4 P |
| 3,484,383 | 12/1969 | Hoffman ....................... | 252/301.4 P |
| 3,488,292 | 1/1970 | McAllister .................... | 252/301.4 P |

OTHER REFERENCES
Chemical Abstracts - Vol. 55, Oct., 1961 page 19,506 c
Copy in Patent Office Search Center Primary Examiner—Robert D. Edmonds
Attorney—Frank R. Trifari ABSTRACT: Mercury-vapor discharge lamp employing as a luminescent material a bivalent europium activated pyrophosphate of calcium or strontium and combinations thereof.

FIG. I

MERCURY VAPOR DISCHARGE LAMP EMPLOYING EUROPIUM ACTIVATED CALCIUM AND/OR STRONTIUM PYROPHOSPHATE LUMINESCENT MATERIAL

The invention relates to a mercury vapor discharge lamp employing a luminescent material provided on a support and capable of being excited by ultraviolet radiation. The invention further relates to such a material.

In many photochemical document copying systems a copy of a document is made by exposing the original to radiation and receiving the reflected or passed radiation on a paper which is sensitive to said radiation and which contains substances which can be decomposed by the radiation as a result of which after further treatment, for example, fixing, a reproduction of the original document is obtained.

For an efficient use of the reproduction papers, a source of radiation is of course desired which emits a strong radiation at the maximum sensitivity of the paper.

The requirement which is usually imposed upon the reproduction papers to be used is that the radiation-sensitive substances are decomposed as little as possible by normal daylight. This of course facilitates the working with these papers and also imposes few requirements upon their storage. Since normal daylight contains comparatively little ultraviolet radiation the best combination is apparently a paper which has a maximum sensitivity below 400 nm. and a source of radiation which emits a strong ultraviolet radiation.

As already noted above, the original to be copied must pass or reflect the radiation. It has now been found that many documents are manufactured from paper which passes and/or reflects ultraviolet radiation comparatively badly. Therefore, due to the contradictory requirements for document copying machines a compromise must be concluded; therefore preferably photosensitive papers are used, the maximum sensitivity of which lies between 380 and 430 nm. and a source of radiation having a maximum of the emitted radiation between said two values.

The source of radiation for document copying machines generally is a low pressure or high pressure mercury vapor discharge lamp having a luminescent layer arranged on a support and converting a large part of the ultraviolet radiation generated in the mercury vapor discharge to radiation with longer wavelength. In this conversion, as already said above, the maximum of the emitted radiation energy must preferably lie in the wavelength range of 380—430 nm. This is the case, for example, with the frequently used substance calcium tungstenate. The efficiency of the conversion of the ultraviolet radiation of the mercury vapor discharge into radiation between 380 and 430 nm., however, is comparatively low for this substance because the emission spectrum is very wide and consequently a great deal of radiation energy is emitted at wavelengths outside said range. In addition, the absorption spectrum of most sensitive papers is considerably narrower than said range. As a result of these two causes only a comparatively small part of the total radiation energy emitted by the calcium tungstenate is effectively used by the sensitive paper.

Another frequently used luminescent substance is a lead-activated silicate of strontium, barium and magnesium. The emission spectrum of the said substance, on being excited by the ultraviolet radiation of a mercury vapor discharge, is not very wide and consequently better suitable for being adapted to the absorption spectrum of a radiation sensitive paper; the maximum emission of said substance, however, lies at 365 nm. and is therefore less suitable for being transmitted or reflected by the paper of most documents. That nevertheless the substance is frequently used is due to the narrow emission band and the strong radiation.

A mercury vapor discharge lamp according to the invention comprises a luminescent material arranged on a support and is characterized in that said luminescent material is a phosphate activated with bivalent europium of the following composition:

$x$Ao. $y$BaO. $z$MgO. $1$P$_2$O$_5$: $p$EuO where A is at least one of the elements strontium and calcium and $1.90 \leq x+y+z+p \leq 2.05$
$0 \leq y \leq 1.2$
$0 \leq z \leq 1.6$
$y+z \leq 1.6$
$0.005 \leq p \leq 0.21$ A luminescent material represented by the above formula can very readily be excited by ultraviolet radiation which is emitted by the discharge of a low pressure or high pressure mercury vapor discharge lamp and then shows a narrow emission spectrum in which substantially the whole luminescent energy is radiated between 380 and 430 nm. Most substances according to the invention have a maximum emission at approximately 420 nm. Since the efficiency of conversion also is very high, namely considerably higher than the above-mentioned two known substances, a lamp according to the invention is particularly suited for use in document copying machines in combination with available radiation-sensitive types of paper having a maximum absorption in said range since now all the above-mentioned imposed requirements are simultaneously satisfied.

In a paper by V. P. N. azarova in Bull. Acad. Sc. USSR, Phys. Ser. Vol. 25, nr. 3, page 322 (1961) a strontium pyrophosphate activated with bivalent europium was already described. However, nothing can be derived from said paper about the properties of this substance upon excitation by short wave or long wave ultraviolet radiation.

The properties of the luminescent material used in a lamp according to the invention are substantially independent of the choice of the element represented by A. So for A strontium or calcium may be chosen or a mixture of these two elements.

The condition $1.90 \leq x+y+z+p \leq 2.05$ indicates that the substance must have approximately the pyrophosphate composition. As is known in preparing a complex crystal lattice with several elements it is sometimes better to start from a mixture in which the quantities of the composing elements do not entirely satisfy the stoichiometric ratio in the pyrophosphate. A small excess of one or more of the starting components often gives a higher yield of the desired product. A small excess of one or more of the starting components then remains in the reaction products. This reaction product fulfills the above-mentioned condition for $x+y+z+p$, although the actual luminescent substance presumably accurately meets the stoichiometric formula of the pyrophosphate. Since it has been found that the retained residues of the starting substances usually have a negligible influence on the luminescence the removal thereof is not always necessary.

The elements barium and magnesium may be absent, as appears from the conditions for $y$ and $z$. The spectral distribution of the emission spectrum is substantially not influenced if barium is present; more than 1.2 mol. of barium, however, gives a decrease of the efficiency of conversion of the ultraviolet radiation and is therefore undesirable.

The quantity of magnesium may be chosen to be larger, namely maximally 1.6 mol. without the efficiency of radiation conversion decreasing too strongly as a result. It has been found, however, that the use of a quantity of magnesium exceeding one-fourth of the quantity of calcium and strontium together, gives rise to the formation of an emission spectrum having two peaks, namely one at approximately 420 nm. and one at approximately 391 nm. The intensities of the emitted radiation at these two wavelengths are correlated and that in such manner that, when the quantity of magnesium is increased, the intensity of the peak at 391 nm. becomes always stronger and the intensity of the peak at 420 nm. becomes always smaller until with a quantity of magnesium oxide of 1.2 mol. substantially no radiation is emitted any longer at 420 nm. The radiation at 391 nm. then is already very strong, however. Preferably a radiation-sensitive paper is chosen with a maximum absorption at approximately 391 nm. For the substances having a smaller quantity of magnesium, the best thing to do is to use a paper having a maximum sensitivity between 420 and 391 nm.

The condition that y+2 is maximally equal to 1.6 is necessary because otherwise in choosing the maximum quantity of magnesium and the maximum quantity of barium, no calcium and/or strontium could be present in the luminescent substance any more. However, these two elements are always necessary.

The quantity of bivalent europium may be varied between the above stated limits but is preferably chosen to be between 0.01 and 0.04. In fact, the highest efficiency of radiation is found in this range.

In addition to the above-mentioned advantages of the luminescent materials according to the invention it is to be noted that the substances are very sparingly sensitive to oxidation. This is of great importance in manufacturing mercury vapor discharge lamps because during said manufacture they are often exposed for a short period of time to heating in air at a rather high temperature, for example, 600° C. Such heating is necessary, for example, when an organic binder is used which has to be removed afterwards by heating.

A particular advantage of luminescent material according to the invention is that a light reflecting layer of titanium dioxide may effectively be used in the mercury vapor discharge lamp according to the invention. The use of such a layer in, for example, low pressure mercury vapor discharge lamps is known. This reflecting layer which is provided between the support of the luminescent material and the luminescent material very strongly reflects visible radiation emitted by the luminescent material. In this manner, for example, lamps may be manufactured the visible radiation of which to one side is strongly increased. Such a principle would be highly desirable for being used also in lamps for document copying machines. If, however, luminescent materials are used, the emitted radiation energy of which lies for a considerable part in the ultraviolet part of the spectrum, for example, the two above-mentioned substances and in particular the silicate of barium, strontium and magnesium, then the use of a titanium dioxide reflector layer serves little purpose because the reflection of the titanium dioxide for ultraviolet radiation is low. This applies in particular to the rutile modification of the titanium dioxide. This reflects substantially no radiation below a wavelength of approximately 400 nm. The reflection of the anatase modification extends somewhat further, namely to a wavelength of approximately 380 nm.

In a mercury vapor discharge lamp according to the invention a titanium dioxide reflection layer may effectively be used, in particular titanium dioxide with the anatase modification, because the radiation of the luminescent material falls, at least for the greater part, in the reflection range of the titanium dioxide. If a substance is used with much magnesium, the rutile modification of the titanium dioxide is less suitable than the anatase modification.

A further advantage of the luminescent materials according to the invention relative to calcium tungstenate and strontium-barium-magnesium-silicate is that they are better excited by radiation having a wavelength of 365 nm. They are thus better suitable for use in a high pressure mercury vapor discharge lamp than said known substances.

In order that the invention may be readily carried into effect, it will now be described in greater detail with reference to a number of examples and a drawing.

FIG. 1 of the drawing shows a graph in which the wavelength in nm. is plotted on the absicissa; the intensity of the luminescent radiation in arbitrary units is plotted on the ordinate.

EXAMPLE 1.

A mixture is prepared of 6.904 gms. of $SrHPO_4$, 0.317 gms. of $(NH_4)_2HPO_4$, 0.070 gms. of $Eu_2O_3$.

This mixture is thoroughly mixed in a mortar and transferred to a crucible The crucible containing the mixture is then transferred to a furnace and heated in air at a temperature of 1200° C. for 2 hours. After heating, the reaction product is pulverized in a mortar and sieved through a sieve having meshes of 220 microns. The material passing the sieve is then again heated in a furnace through which air is passed at a temperature of 1200° C. for 2 hours. After cooling the crucible with its contents to room temperature the reaction product is ground fine and sieved. It is then ready for use.

The composition of the reaction product satisfies the formula:

1.88 SrO . 1 $P_2O_5$ : 0.02 EuO

Upon excitation with ultraviolet radiation originating from a low pressure or high pressure mercury vapor discharge lamp, the luminescent material emits a radiation the spectral distribution of which is shown in the drawing by curve 1.

Instead of heating in air, heating may also be performed in a neutral or weakly reducing atmosphere, for example, in a mixture of nitrogen with 0.1 percent to 8 percent by volume of hydrogen. As a result of this a higher radiation efficiency of the luminescent material is obtained. A presumable explanation for this is that in this manner a fuller conversion of the $Eu_2O_3$ into EuO is obtained. However, this conversion also takes place when heating in air. An explanation for this is that apparently the europium is preferably incorporated in a bivalent from in the crystal lattice because the ionic radii of strontium and bivalent europium are substantially the same.

If required the reducing atmosphere may alternatively be obtained by placing in the furnace, beside the crucible with the mixture, a crucible containing finely divided carbon and heating in air or another oxygen-containing gas. The oxygen forms, with the carbon, carbon monoxide which forms the reducing atmosphere above the reaction mixture.

Example 2.

A mixture is prepared of
4.333 gms. of $SrPHO_4$
2.177 gms. of $CaHPO_4$
0.053 gms. of $(NH_4)^2HPO_4$ and 0.070 gms. of $Eu_2O_3$.

This mixture is treated in the same manner as described in example 1 on the variations thereof.

The resulting luminescent material satisfies the formula:
1.18 SrO. 0.80 CaO . 1 $P_2O_5$ : 0.02 EuO.

Upon excitation with ultraviolet radiation originating from a low pressure or high pressure mercury vapor discharge lamp the luminescent material emits a radiation the spectral distribution of which is also shown in the drawing by curve 1.

Example 3.

A mixture is prepared from
5,388 gms. of $CaHPO_4$
0.053 gms. of $(NH_4)_2PHO_4$
0.070 gms. of $EU_2O_3$ This mixture is treated in quite the same manner as described in example 1 or the variations thereof.

The resulting luminescent material satisfies the formula
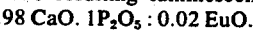
1.98 CaO . 1$P_2O_5$ : 0.02 EuO.

Upon excitation with ultraviolet radiation originating from a low pressure or high pressure mercury vapor discharge lamp the luminescent material emits a radiation the spectral distribution of which is likewise given by the curve 1 in the drawing.

Example 4.

A mixture is prepared from:
5.802 gms. of $SrHPO_4$
1.867 gms. of $BaHPO_4$
0.053 gms. of $(NH_4)_2HPO_4$
0.070 gms. of $Eu_2O_3$.

This mixture is treated in quite the same manner as described in example 1 or the variations thereof.

The resulting luminescent material satisfies the formula:

1.58 SrO. 0.40 BaO. 1 P$_2$O$_5$ : 0.02 EuO.

Upon excitation with ultraviolet radiation originating from a lower pressure or a high pressure mercury vapor discharge lamp, the luminescent material emits a radiation the spectral distribution of which is likewise given by the curve 1 in the drawing.

Example 5.

A mixture is prepared from:
5.802 gms. of SrHPO$_4$
1.099 gms. of MgNH$_4$PO$_4$
0.053 gms. of (NH$_4$)$_2$HPO$_4$
0.070 gms. of Eu$_2$O$_3$.

This mixture is treated in quite the same manner as described in Example 1 or the variations thereof.

The resulting luminescent material satisfies the formula:
1.58 SrO. 0.40 MgO. 1P$_2$O$_5$ : 0.02 EuO.

Upon excitation with ultraviolet radiation originating from a low pressure or high pressure mercury vapor discharge lamp the luminescent material emits radiation the spectral distribution of which is likewise given by the curve 1 in the drawing.

Example 6.

A mixture is prepared from:
6.427 gms. of SrHPO$_4$
0.660 gms. of (NH$_4$)$_2$HPO$_4$
0.528 gms. of Eu$_2$O$_3$ This mixture is treated in quite the same manner as described in example 1 or the variations thereof.

The resulting luminescent material satisfies the formula:
1.75 SrO. 1P$_2$O$_5$ : 0.15 EuO.

Upon excitation with ultraviolet radiation originating from a low pressure or high pressure mercury vapor discharge lamp the luminescent material emits radiation the spectral distribution of which is likewise given by the curve 1 in the drawing

Example 7.

A mixture is prepared from
5.068 gms. of SrHPO$_4$
0.544 gms. of CaHPO$_4$
0.549 gms. of MgNH$_4$PO$_4$
0.933 gms. of BaHPO$_4$
0.053 gms. of (NH$_4$)$_2$HPO$_4$
0.070 gms. of Eu$_2$O$_3$.

This mixture is treated in quite the same manner as described in example 1 or the variations thereof.

The resulting luminescent material satisfies the formula:
1.38 SrO. 0.20 CaO. 0.20 MgO. 0.20 BaO. 1P$_2$O$_5$ : 0.02 EuO.

Upon excitation with ultraviolet radiation originating from a low pressure or high pressure mercury vapor discharge lamp the luminescent material emits radiation the spectral distribution of which is likewise given by the curve 1 in the drawing.

Example 8.

A mixture is prepared from:
5.802 gms. of SrHPO$_4$
0.933 gms. of BaHPO$_4$
0.544 gms. of CaHPO$_4$
0.053 gms. of (NH$_4$)$_2$HPO$_4$
0.070 gms. of Eu$_2$O$_3$.

This mixture is treated in quite the same manner as described in example 1 or the variations thereof.

The resulting luminescent material satisfies the formula:
1.58 SrO. 0.20 BaO. 0.20 CaO. 1P$_2$O$_5$ : 0.20 EuO.

Upon excitation with ultraviolet radiation originating from a low pressure or high pressure mercury vapor discharge lamp the luminescent material emits radiation the spectral distribution of which is likewise given by the curve 1 in the drawing.

Example 9.

A mixture is prepared from:
2.864 gms. of SrHPO$_4$
3.296 gms. of MgNH$_4$PO$_4$
0.053 gms. of (NH$_4$)$_2$HPO$_4$
0.070 gms. of Eu$_2$O$_3$.

This manner is treated in quite the same manner as described in example 1 or the variation thereof.

The resulting luminescent material satisfies the formula:
0.78 SrO. 1.20 MgO. 1 P$_2$O$_5$ : 0.02 EuO.

Upon excitation with ultraviolet radiation originating from a low pressure or high pressure mercury vapor discharge lamp the luminescent material emits radiation the spectral distribution of which is given by the curve 2 in the drawing.

In the drawing the broken-line curve 3 denotes the spectral energy distribution of the known calcium tungstenate and the broken-line curve 4 denotes the spectral energy distribution of the known lead-activated silicate of barium, strontium and magnesium. These curves are shown for a comparison both for the spectral distribution and for the intensity of the luminescence radiation. The maximum intensity of curve 4 is assumed to be 100. As is apparent from the drawing, the luminescent substances which are used in a mercury vapor discharge lamp according to the invention give considerably narrower emission ranges having much higher peak values than the known substances.

Figure 2:
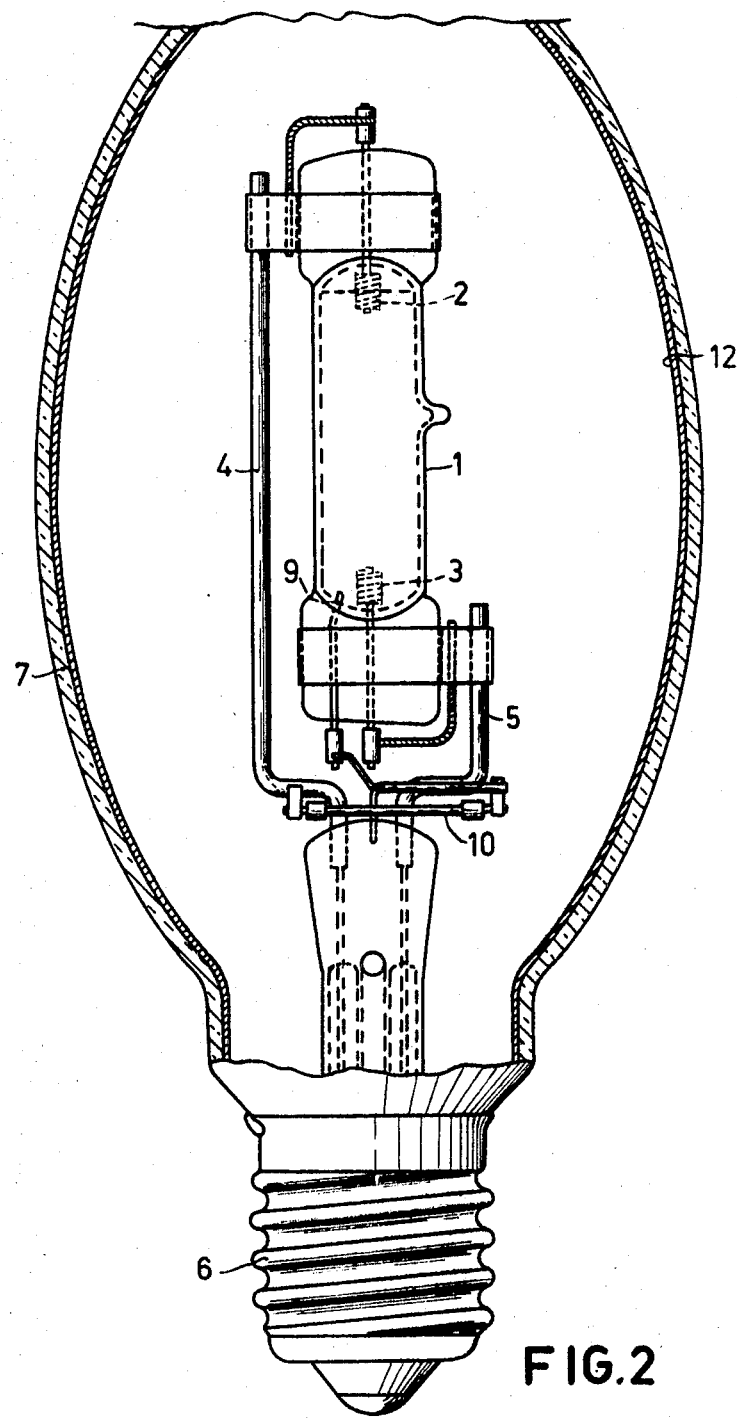

FIG. 2 shows an embodiment of a high pressure mercury vapor discharge lamp according to the invention.

A straight high-pressure mercury vapor discharge tube is provided with electrodes 2 and 3 of which electrode 2 is connected in the usual manner via a long lead-in and supporting wire 4 with the aid of a bipolar screw cap 6 to one end in the drawing end of the evacuated outer envelope 7 surrounding the assembly. A short supporting and lead-in wire 5 is provided for electrode 3.

In the embodiment tube 1 is quartz glass and is provided with an ignition electrode 9 connected through a resistor 10 to the conductor 4. The distance between the electrodes 2 and 3 was approximately 50 mm. and the inner volume was approximately 15 cm$^3$. The tube 1 contained ±60 mgs. of mercury which evaporated completely during normal operation and produced an operating voltage of approximately 125 v. at a minimum wall temperature of approximately 580° C. (at a power of approximately 400w.)

The interior side of the envelope 7 is coated with a layer 12 of a luminescent material prepared according to one or more of the examples 1 to 9. This coating is carried out by using a suspension of the luminescent material in a suitable medium e.g. consisting of nitrocellulose in amylacetate. After the coating the layer applied is dried and heated so as to remove the amylacetate and the nitrocellulose.

What We claim is:

1. A mercury vapor discharge lamp comprising a discharge tube containing mercury, a pair of electrodes within said tube and a luminescent material supported within said lamp, said luminescent material being a phosphate activated with bivalent europium of the following composition:

$x$ AO. $Y$BaO. $z$MgO. 1 P$_2$O$_5$: $p$ EuO. where A is at least one of the elements strontium and calcium and
$1.90 \leq x+y+z+p \leq 2.05$
$0. \leq y \leq 1.2$
$0 \leq z \leq 1.6$
$y+z \leq 1.6$
$0.005 \leq p \leq 0.21$.

2. A mercury vapor discharge lamp as claimed in claim 1 wherein:
$0.01 \leq p \leq 0.04$.

3. A mercury vapor discharge lamp as claimed in claim 2, characterized in that a light reflecting layer of titanium dioxide is provided between the support of the luminescent material and said luminescent material.